US009296393B2

(12) United States Patent
Oh et al.

(10) Patent No.: US 9,296,393 B2
(45) Date of Patent: Mar. 29, 2016

(54) APPARATUS AND METHOD FOR RECOGNIZING VEHICLE

(71) Applicant: Hyundai Motor Company, Seoul (KR)

(72) Inventors: Young Chul Oh, Seongnam-si (KR); Myung Seon Heo, Seoul (KR)

(73) Assignee: Hyundai Motor Company, Seoul (KR)

( * ) Notice: Subject to any disclaimer, the term of this patent is extended or adjusted under 35 U.S.C. 154(b) by 137 days.

(21) Appl. No.: 14/144,257

(22) Filed: Dec. 30, 2013

(65) Prior Publication Data

US 2015/0098076 A1   Apr. 9, 2015

(30) Foreign Application Priority Data

Oct. 8, 2013   (KR) .................. 10-2013-0119734

(51) Int. Cl.
  *G01S 3/08*      (2006.01)
  *B60W 30/16*     (2012.01)
  *G01S 17/93*     (2006.01)
  *G01S 17/66*     (2006.01)
  *G01S 17/89*     (2006.01)
  *G01S 7/48*      (2006.01)

(52) U.S. Cl.
  CPC .............. *B60W 30/16* (2013.01); *G01S 7/4808* (2013.01); *G01S 17/66* (2013.01); *G01S 17/89* (2013.01); *G01S 17/936* (2013.01); *B60W 2550/302* (2013.01); *B60W 2550/308* (2013.01)

(58) Field of Classification Search
  CPC ......... G01C 3/08; G01S 7/4808; G01S 17/66; B60W 30/16
  See application file for complete search history.

(56) References Cited

U.S. PATENT DOCUMENTS

| 8,699,755 B2 * | 4/2014 | Stroila et al. .................. 382/106 |
| 8,818,609 B1 * | 8/2014 | Boyko et al. .................... 701/28 |
| 2009/0069938 A1 | 3/2009 | Nishimura et al. |
| 2009/0232388 A1 * | 9/2009 | Minear et al. ................. 382/154 |
| 2010/0328058 A1 * | 12/2010 | Kanenari et al. ............. 340/447 |

FOREIGN PATENT DOCUMENTS

| JP | 2003-099762 A | 4/2003 |
| JP | 2004-198323 A | 7/2004 |
| JP | 2009-223900 A | 10/2009 |
| JP | 2010-185769 A | 8/2010 |
| JP | 5187878 B2 | 4/2013 |
| KR | 10-2011-0073948 A | 6/2011 |
| KR | 10-1268523 B1 | 5/2013 |

OTHER PUBLICATIONS

D. Yoon et al., "LiDAR Point Cloud Data Clustering and Classification for Obstacle Recognition of UGV," The Korean Society of Automotive Engineers, Nov. 2002, pp. 1339-1343.

* cited by examiner

*Primary Examiner* — Luke Ratcliffe
*Assistant Examiner* — Samantha K Abraham
(74) *Attorney, Agent, or Firm* — McDermott Will & Emery LLP (57) ABSTRACT

An apparatus and method for recognizing a vehicle. The apparatus includes a sensor configured to provide point cloud data corresponding to a front object detected by using a LiDAR; a shape determiner configured to determines a shape corresponding to the front object by analyzing the point cloud data provided by the sensor; a receiving sensitivity analyzer configured to analyze a receiving sensitivity change corresponding to each point of the point cloud data provided by the sensor based on the shape of the vehicle; a decider configured to decide whether the front object is a vehicle according to the shape corresponding to the front object and the receiving sensitivity change corresponding to points of the point cloud; and a detector configured to recognize and detect the front object as the vehicle based on the result decided by the decider.

13 Claims, 9 Drawing Sheets

APPARATUS AND METHOD FOR RECOGNIZING VEHICLE

CROSS-REFERENCE TO RELATED APPLICATION

This application claims the benefit of priority to Korean Patent Application No. 2013-0119734, filed on Oct. 8, 2013 in the Korean Intellectual Property Office, the invention of which is incorporated herein in its entirety by reference.

TECHNICAL FIELD

The present disclosure relates generally to an apparatus and method for recognizing a vehicle, and more particularly, to recognizing a vehicle from the front based on a LiDAR sensor.

BACKGROUND

In general, in controlling a vehicle, cognitive information on a vehicle in front, and information corresponding to distance and speed of the front vehicle are frequently used for controlling a distance between cars.

Radar is most commonly used in controlling distance between cars; however, radar not able to accurately determine that the object in front in fact is a vehicle, but may determine the vehicle just by using speed. Therefore, radar may not be able to determine accurately whether what is in front is a low-speed vehicle or a stopped vehicle.

Accordingly, technology for detecting the vehicle based on an image is applied; however, many computations may be required to detect the vehicle from an image, and as a result, accuracy recognizing the vehicle from the image may be degraded when the surroundings are dark, such as at night time or inside a tunnel.

Therefore, although it is possible to detect the front vehicle by combining the radar and image technology, as described above, it may be difficult to identify accurately when the vehicle drives at low-speed at night or when the vehicle is stopped.

SUMMARY

The present invention has been made in view of the above problems, and provides a vehicle recognizing apparatus and method which enables to recognize a front vehicle quickly by classifying a front object by using a single LiDAR sensor.

In accordance with an aspect of the present invention, a vehicle recognizing apparatus includes a sensor configured to provide a point cloud data corresponding to a front object detected by using a LiDAR; a shape determiner configured to determine a shape corresponding to the front object by analyzing point cloud data provided from the sensor; a receiving sensitivity analyzer configured to analyze a receiving sensitivity change corresponding to each point of the point cloud data provided by the sensor based on a shape of the vehicle; a decider configured to decide whether the front object is a vehicle according to the shape corresponding to the front object and the receiving sensitivity change corresponding to points of the point cloud; and a detector configured to recognize and detect the front object as the vehicle based on the result decided by the decider. The shape determiner estimates a size and a speed corresponding to the front vehicle by clustering the point cloud data and tracking each point. The shape determiner detects a peak point which has a peak value by calculating a distance between a vector connecting a start point to an end point and each point from the point cloud data. The shape determiner determines a shape of the point cloud with any one of a rectangle type, a straight line type, and a curve type based on a distance between the start point and the end point, a peak value of distance between a vector connecting the start point to the end point and each point, and a height and a width of a clustering area from the point cloud data. The decider primarily classifies the front object as the vehicle by deciding whether a shape of the point cloud corresponding to the front object is of a rectangle type or a straight line type. The receiving sensitivity analyzer performs sampling and differentiates a receiving signal strength indicator (RSSI) of surroundings of a peak point, when a shape of the point cloud corresponding to the front object primarily classified as the vehicle is a rectangle type. The decider finally classifies a corresponding object as the vehicle, when a value, which is obtained by performing sampling and differentiating the receiving signal strength indicator (RSSI) of surroundings of the peak point, is approximately a peak index value. The receiving sensitivity analyzer performs sampling and differentiates the receiving signal strength indicator of surroundings of the start point and the end point, when a shape of the point cloud corresponding to the front object primarily classified as the vehicle is of a straight line type. The decider finally classifies a corresponding object as the vehicle, when a value, which is obtained by performing sampling and differentiating the receiving signal strength indicator of surroundings of the start point and the end point, is greater than a threshold and is approximately a start index and an end index. The decider finally classifies a corresponding object as the vehicle, when a value, which is obtained by performing sampling and differentiating the receiving signal strength indicator of surroundings of the start point and the end point, is greater than a threshold, and is approximately any one of the start index and the end index, and a speed of the point cloud is greater than the threshold.

In accordance with another aspect of the present invention, a method of method for recognizing a vehicle includes: receiving a point cloud data corresponding to a front object detected through a LiDAR sensor; determining a shape corresponding to a corresponding point cloud by analyzing the received point cloud data; primarily classifying the front object as a vehicle according to the shape of the point cloud; finally classifying the corresponding object as the vehicle according a receiving sensitivity variation by analyzing the receiving sensitivity variation of surroundings of a specific point according to the shape of the point cloud corresponding to the object primarily classified as the vehicle; and recognizing and detecting the front object finally classified as the vehicle. Determining the shape comprises determining the shape of the point cloud with any one of a rectangle type, a straight line type, and a curve type based on a distance between the start point and the end point, a peak value of distance between a vector connecting the start point to the end point and each point, and a height and a width of a clustering area from the point cloud data. The finally classifying of the corresponding object comprises primarily classifying the front object as the vehicle by deciding whether a shape of the point cloud corresponding to the front object is a of rectangle type or a straight line type.

BRIEF DESCRIPTION OF THE DRAWINGS

The objects, features and advantages of the present invention will be more apparent from the following detailed description in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
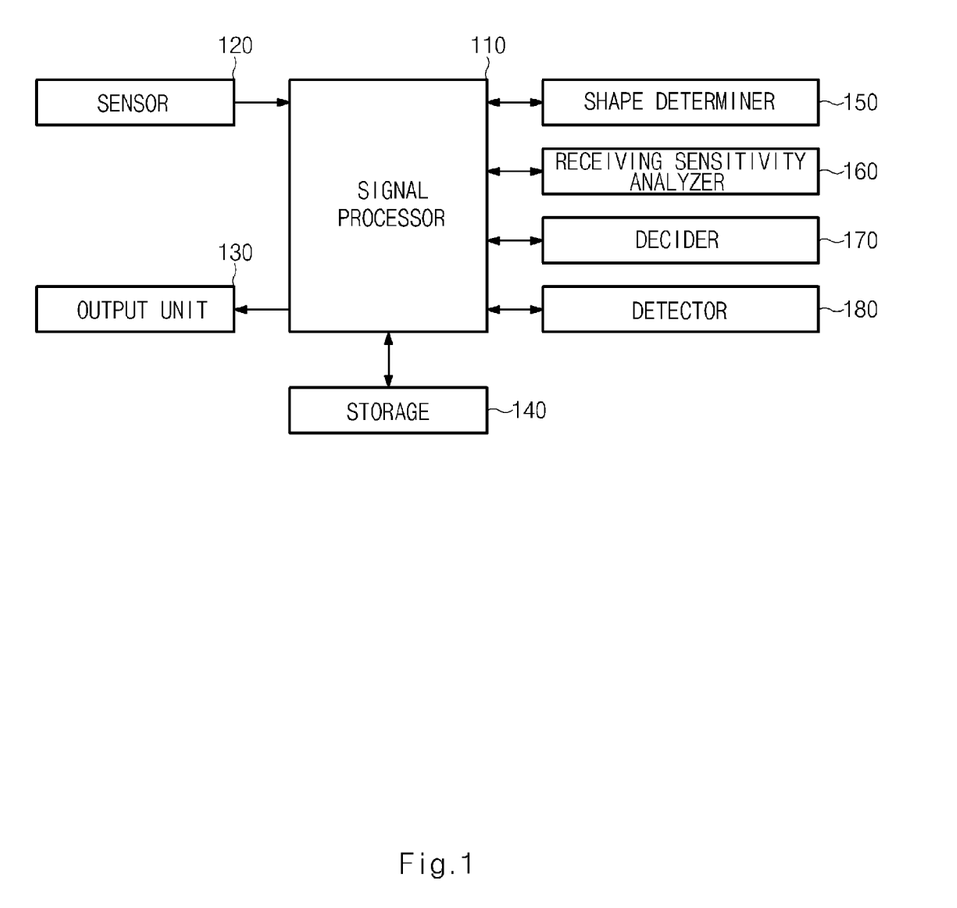
FIG. 1 is a block diagram illustrating a configuration of a vehicle recognizing apparatus according to an embodiment of the present invention.

FIG. 1 illustrates a configuration of a vehicle recognizing apparatus according to an embodiment of the present invention. Referring to FIG. 1, the vehicle recognizing apparatus according to the embodiment may include a signal processor 110, a sensor 120, an output unit 130, a storage 140, a shape determiner 150, a receiving sensitivity analyzer 160, a decider 170, and a detector 180. Here, the signal processor 110 processes a signal delivered to each unit of the vehicle recognizing apparatus.

The sensor 120 is the means to detect a front object, and in embodiment of the present invention, a LiDAR sensor detecting the object based on the LiDAR may be applied.

Here, the LiDAR is an abbreviation for the known 'Light Detection and Ranging' which is an active observation device obtaining the required information through a laser by using an identical principle as in radar without any direct contact to the object. In general, LiDAR is a technology which enables one to obtain a detailed three-dimension Digital Elevation Model (DEM) as well as to measure a shoreline and a submarine topography in shallow water by mounting on an aircraft where a Global Positioning System (GPS) and an Inertial Navigation System (INS) are installed. Such LiDAR based sensor 120, that is, the LiDAR sensor may measure the surrounding environment, and may provide a set of point information, that is, point cloud data according to each vertical angle and horizontal rotation.

The output unit 130 is the means to output an operating state and an operating result of the vehicle recognizing apparatus. Here, the output unit 130 may be a display means such as a monitor and a navigation screen equipped in the vehicle, and may be a sound output means such as a speaker or a buzzer. In addition, the output unit 130 may be a separate output terminal providing corresponding information to the external devices connected wired or wirelessly.

The storage 140 may store a preset value to operate the vehicle recognizing apparatus, and may store the point cloud data corresponding to the front object obtained by the sensor 120 in the storage 140. In addition, the storage 140 may store a processing condition and a processing result in each unit of the vehicle recognizing apparatus corresponding to the point cloud data.

The shape determiner 150 may determine a shape corresponding to the front object by analyzing the point cloud data provided from the sensor 120. In particular, the shape determiner 150 may estimate a size corresponding to the point cloud of the front object by clustering the point cloud data provided from the sensor 120. In addition, the shape determiner 150 may estimate a speed corresponding to the point cloud of the front object by tracking the point cloud data provided from the sensor 120.

At this time, the shape determiner 150 may detect a peak point having a peak value by calculating a distance between a vector connecting the start point to the end point and each point.

Furthermore, the shape determiner 150 may determine a shape of the point cloud according to a position of each point from the point cloud data. At this time, the shape determiner 150 may determine the shape of the point cloud based on a distance between the start point and the end point, a peak value of the distance between a vector connecting the start point to the end point and each point, and a height and a width of a clustering area from the point cloud data.

Here, the shape of the point cloud may determine the shape of the corresponding point cloud as any one of a rectangle type in a rectangle shape (hereinafter, 'L' type), a straight line type in a straight line shape (hereinafter 'S' type), and a curve type in a curve shape (hereinafter 'C' type).

For example, when a distance (D) between the start point and the end point, a peak value of the distance between a vector connecting the start point to the end point and each point, and a height and a width of the clustering area from the point cloud data satisfy a condition of the following [Equation 1], the shape determiner 150 may determine it as an "L type".

$$\left(\frac{PeakValue}{D} > threshold_l\right) \text{ AND} \quad \text{[Equation 1]}$$

$$(\text{width} > threshold_w \| \text{Height} > threshold_h)$$

Meanwhile, when a distance (D) between the start point and the end point, a peak value of the distance between a vector connecting the start point to the end point and each point, and a height and a width of the clustering area from the point cloud data do not satisfy a condition of the preceding [Equation 1], but satisfy a condition of [Equation 2], then, the shape determiner 150 may determine it as an "S type".

$$\left(\frac{PeakValue}{D} > threshold_c\right) \text{ AND} \quad \text{[Equation 2]}$$

$$(\text{width} > threshold_w \| \text{Height} > threshold_h)$$

Meanwhile, when a distance (D) between the start point and the end point, a peak value of the distance between a vector connecting the start point to the end point and each point, and a height and a width of the clustering area from the point cloud data do not satisfy the conditions of both [Equation 1] and [Equation 2], then the shape determiner 150 may determine it as a "C type".

A detailed operation determining the shape of the point cloud in the shape determiner 150 will be described in more detail with reference to FIGS. 4A to 4C.

The receiving sensitivity analyzer 160 may analyze the receiving sensitivity change corresponding to each point of the point cloud data provided by the sensor 120 based on the shape of the vehicle.

The received signal strength indicator (RSSI) of the signal detected by the sensor 120 may be changed according to a color and a material of a part where each point of the point cloud data is positioned. Therefore, the receiving sensitivity analyzer 160 may analyze the receiving sensitivity variation by sampling and differentiating the receiving sensitivity of the signal reflected by the vehicle itself and a lamp.

For example, when the shape of the point cloud corresponding to the front object which is primarily classified as the vehicle is of the L type, the receiving sensitivity analyzer 160 may perform sampling and differentiate the RSSI of a peak point surrounding. In addition, the receiving sensitivity analyzer 160 may perform sampling and differentiate a receiving signal strength indicator (RSSI) of surroundings of the start point and the end point among each point of the point cloud when the shape of the point cloud corresponding to the front object which has been primarily classified as of the vehicle is S type.

The receiving sensitivity variation corresponding to the points of the point cloud analyzed by the receiving sensitivity analyzer 160 may be used to finally determine that the front object is the vehicle.

The decider 170 may primarily classify the front object as the vehicle based on the shape of the corresponding object when the shape of the front object is determined by the shape determiner 150, and may finally classify it as the vehicle based on the receiving sensitivity variation of the points corresponding to the object primarily classified as the vehicle.

In other words, when the shape of the point cloud corresponding to the front object determined by the shape determiner 150 is of the C type, the decider 170 may classify the front object as a non-vehicle object such as a guard rail or an outer wall of a building. On the other hand, when the shape of the point cloud corresponding to the front object determined by the shape determiner 150 is of the L type or S type, then the decider 170 may primarily classify the corresponding front object as the vehicle.

In addition, the decider 170 may finally classify it as the vehicle based on the analysis result of the receiving sensitivity analyzer 160 corresponding to a specific point surrounding according to the shape of the point cloud corresponding to the front object primarily classified as the vehicle.

In other words, when the shape of the point cloud corresponding to the front object primarily classified as the vehicle is of the L type, the decider 170 may perform sampling for the receiving signal strength indicator corresponding to a peak point surroundings among the point clouds, and finally classify the corresponding object as the vehicle when a maximum value of an absolute vale of a differentiated value is approximately a peak index value.

Meanwhile, when the shape of the point cloud corresponding to the front object primarily classified as the vehicle is of the S type, and when a maximum value of an absolute value of the differentiated receiving signal strength indicator corresponding to surroundings of the start point and the end point among the point cloud is greater than a threshold, and is approximately a start index and an end index, the decider 170 may finally classify the corresponding object as the vehicle.

The detector 180 may recognize the front object, finally classified as the vehicle, as a vehicle based on the result decided by the decider 170, and may detect the corresponding vehicle. At this time, the detected vehicle information may be output through the output unit 130.

FIGS. 2 to 5 illustrate an operation of a vehicle recognizing apparatus according to the present invention.

Figure 2:
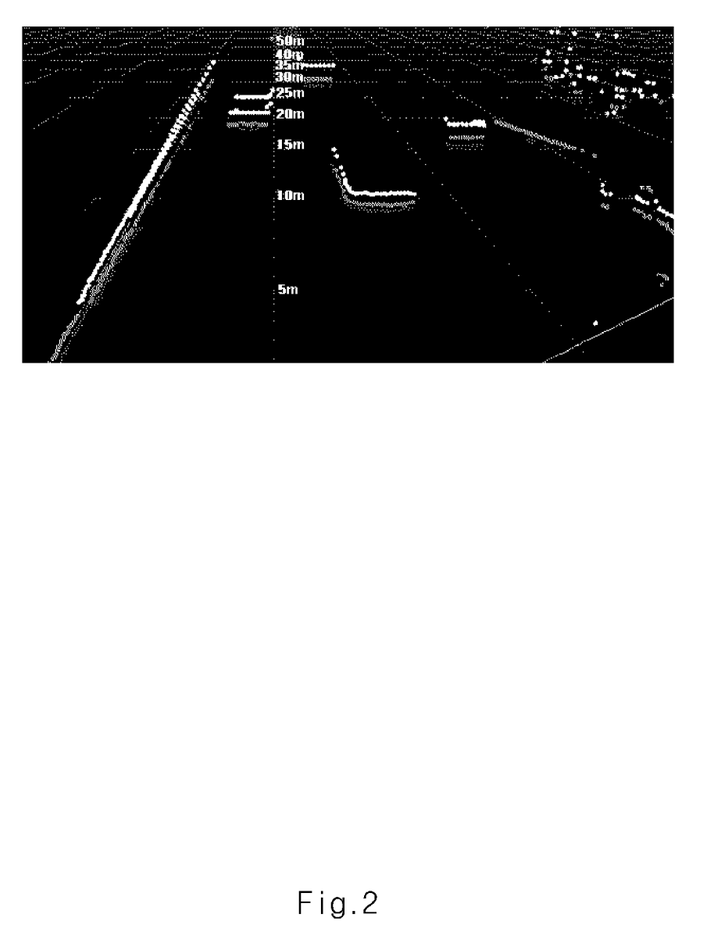
FIGS. 2 to 5 illustrate an operation of a vehicle recognizing apparatus according to the present invention.

First, FIG. 2 illustrates the point cloud data provided by the sensor. As illustrated in FIG. 2, the LiDAR sensor applied in an embodiment of the present invention may obtain the surroundings information through the laser by using an identical principle to that of the radar, and may provide the point cloud data like FIG. 2 by collecting the obtained information as the point information according to a vertical angle and a horizontal rotation respectively. At this time, the point cloud data may include the point cloud corresponding to the vehicle of the surroundings of the own vehicle, and may include the point cloud corresponding to a guard rail or a building, etc. rather than the vehicle.

Figure 3A:
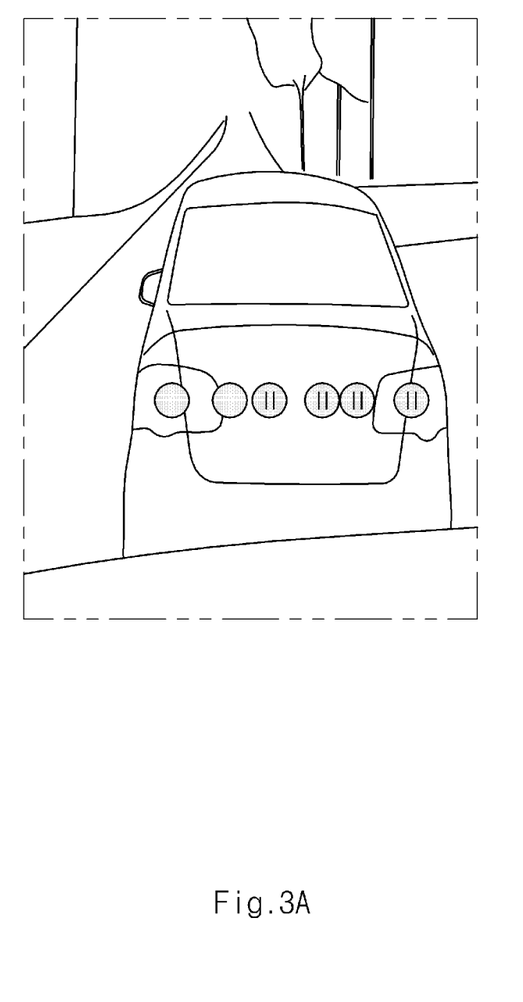
Figure 3B:
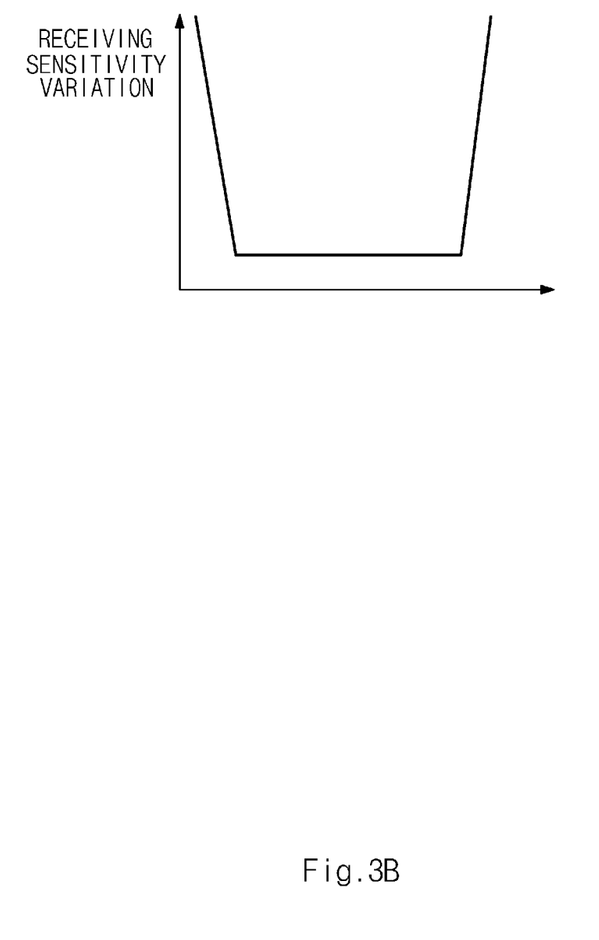

FIGS. 3A and 3B illustrate the receiving sensitivity variation corresponding to the point cloud. Here, FIG. 3A illustrates the point cloud obtained from the front vehicle, and FIG. 3B illustrates the receiving sensitivity variation corresponding to the point cloud of FIG. 3A.

Referring to FIGS. 3A and 3B, the signal detected by the LiDAR sensor which has been applied to an embodiment of the present invention may have a different receiving signal strength indicator according to a color and a material of the part where each point illustrated in FIG. 3A is positioned. In other words, the receiving sensitivity of a signal reflected on a surface of the vehicle itself may be different from that of a signal reflected from a lamp. In addition, the receiving sensitivity of the signal reflected on the vehicle itself may be different from that of the signal reflected by a road.

Therefore, the receiving sensitivity of the signal reflected by a rear side of the vehicle itself in FIG. 3A does not have any change as FIG. 3B; however, it may be verified that the receiving sensitivity of the signal reflected by both side rear lights of the vehicle itself may be different from that of the signal reflected by a rear side of the middle.

Likewise, the vehicle recognizing apparatus according to an embodiment of the present invention is able to classify the detected object as the vehicle based on the receiving sensitivity variation of the signal reflected by the vehicle.

Figure 4A:
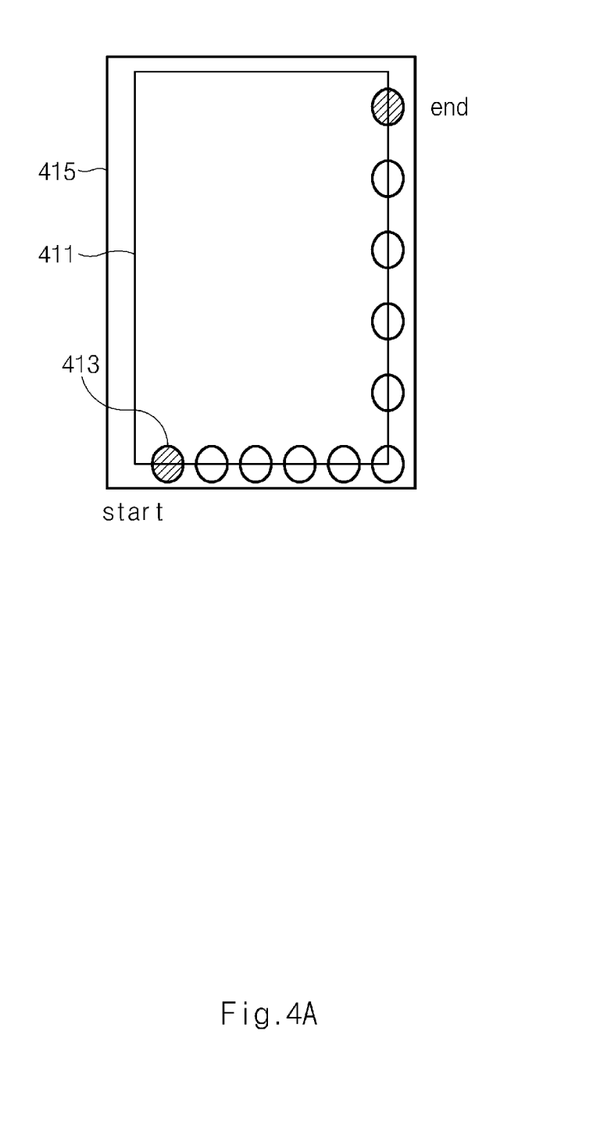
Figure 4B:
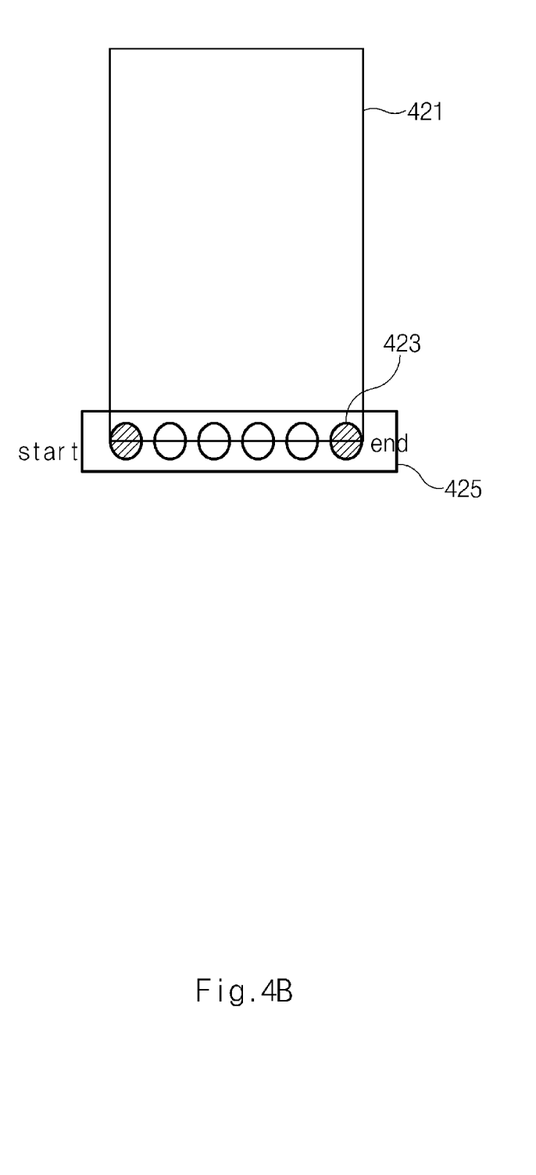
Figure 4C:
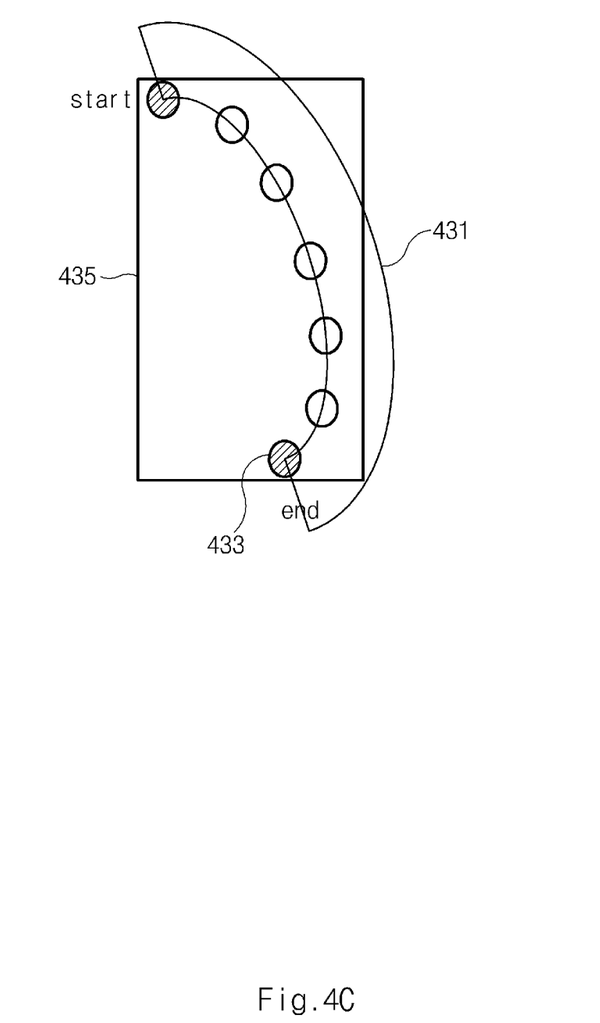

FIGS. 4A to 4C illustrate a shape of a point cloud according to each type.

First, FIG. 4A illustrates a point cloud of L type, FIG. 4B illustrates a point cloud of the S type, and FIG. 4C illustrates a point cloud of the C type.

Referring to FIG. 4A, '411' illustrates an object detected by the sensor, '413' illustrates each point of the point cloud, and '415' illustrates a clustering area corresponding to the point cloud. When it is of L type, as in FIG. 4A, a horizontal/vertical position of the start point and the end point is different, and each point may be disposed in a row with the start point in a direction of 90 degrees based on a peak point, or may be disposed in a row with the end point.

Therefore, the vehicle recognizing apparatus may determine the shape of the corresponding object from the point cloud data as in FIG. 4a. In case of an L type, it may be detected from the object made in the form of a rectangle such as the vehicle itself or the building, etc.

Meanwhile, referring to FIG. 4B, '421' illustrates an object detected by the sensor, '423' illustrates each point of the point cloud, and '425' illustrates the clustering area corresponding to the point cloud. In the case of an S type as in FIG. 4B, the horizontal position of the start point and the end point are the same, and may have a form where each point is disposed in a row between the start point and the end point.

Therefore, the vehicle recognizing apparatus may determine the shape of the corresponding object from the point cloud data like FIG. 4B. Even in the case of an S type, the shape may be detected from the object made in a form of a flat side, such as the vehicle itself or the building, etc.

Meanwhile, referring to FIG. 4C, '431' illustrates the object detected from the sensor, '433' illustrates each point of the point cloud, and '435' illustrates the clustering area corresponding to the point cloud. In the case of a C type as in FIG. 4C, the horizontal/vertical position of the start point and the end point may be varied. However, each point may be disposed with a curve shape between the start point and the end point.

Therefore, the vehicle recognizing apparatus may determine the shape of the corresponding object from the point cloud data like FIG. 4C. In the case of a C type, the shape may not be a shape that can be detected as resulting from a vehicle or a building of an angulated type, but may be detected from the guard rail, a curved building, or on a surface of a soundproof wall. Therefore, when the shape of the point cloud is of a C type, the shape may be classified as a non-vehicle in a primarily classifying step.

Figure 5:
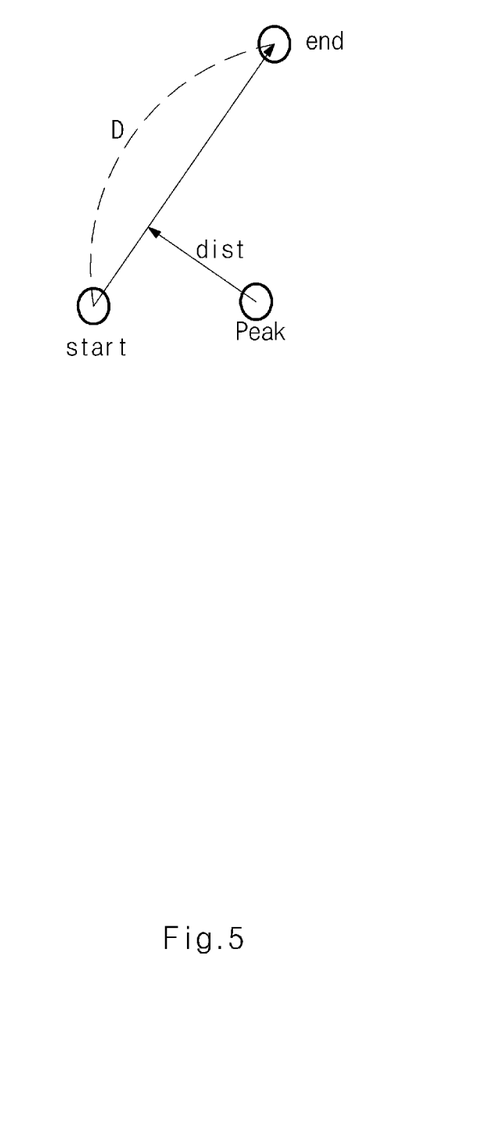

FIG. 5 illustrates an operation detecting a peak point corresponding to each point of a point cloud.

Referring to FIG. 5, D is a distance between the start point and the end point, and may detect the point where a distance becomes the peak value as the peak point by calculating the distance between a vector connecting the start point to the end point and each point of the point cloud from the point cloud data.

Here, the peak value may be calculated as the following [Equation 3].

$$PeakValue = Max\{dist(start+1; end-1)\} \quad [Equation\ 3]$$

Here, PeakValue refers to the peak value, dist refers to a distance between a vector connecting the start point to the end point and each point of the point cloud, start refers to the start point among the points of the point cloud, and end refers to the end point.

As described in [Equation 3], the vehicle recognizing apparatus may calculate a distance between a next sequence point of the start point, a point previous to the end point and a vector connecting the start point to the end point, then calculate again a distance between the next again sequence point of the start point, a point next previous to the end point and a vector connecting the start point to the end point, set the value having the distance value that becomes the peak as the peak value, and may decide the corresponding point as the peak point.

At this time, a distance value between a vector connecting the start point to the end point and the peak point may be applied in determining the shape of the front object.

An operational flow of the vehicle recognizing apparatus according to an embodiment of the present invention configured as mentioned above is described in more detail as follows.

Figure 6:
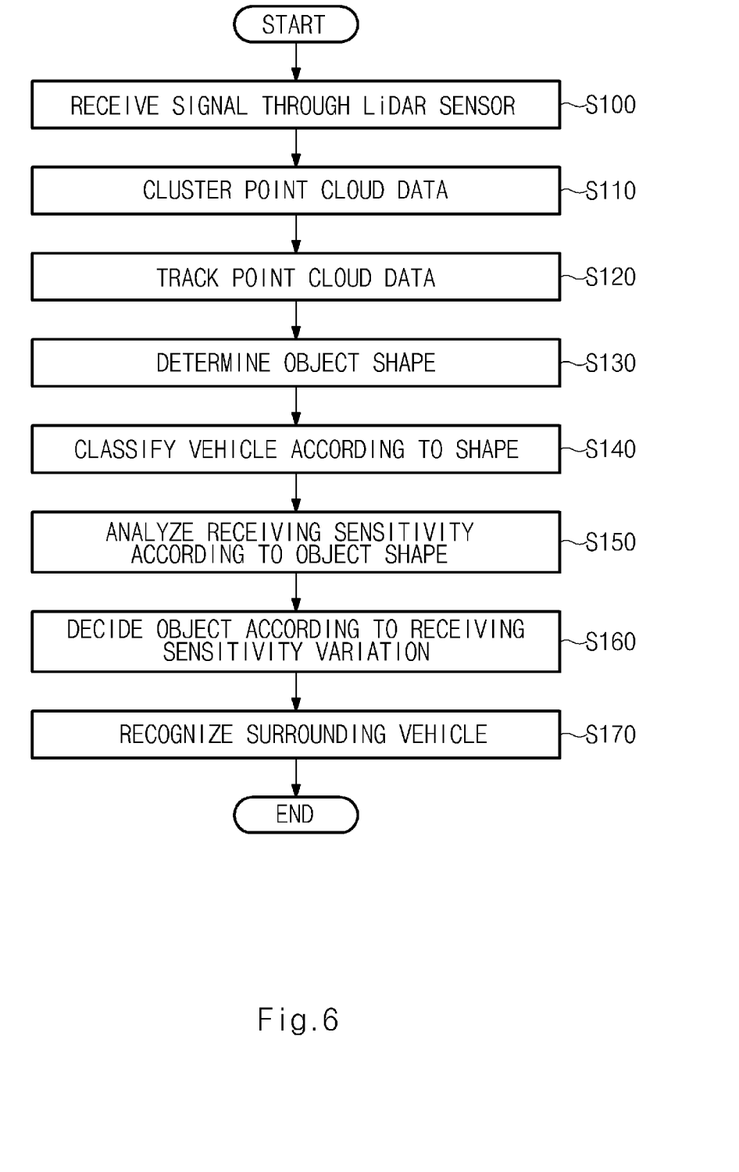
FIG. 6 is a flowchart illustrating an operation flow corresponding to a vehicle recognizing method according to an embodiment of the present invention.

FIG. 6 is a flowchart illustrating an operational flow corresponding to the vehicle recognizing method according to an embodiment of the present invention. Referring to FIG. 6, the vehicle recognizing apparatus according to the embodiment may receive a signal through a LiDAR sensor (S100), and may detect the front object through this. Here, the LiDAR sensor may provide the point cloud data corresponding to the front object.

Therefore, the vehicle recognizing apparatus may estimate a size of the front object by clustering the point cloud data from the LiDAR sensor (S110), and may estimate a speed of the front object by tracking (S120).

In addition, the vehicle recognizing apparatus may determine a shape of the point cloud based on a distance (D) between the start point and the end point, a peak value of the distance between a vector connecting the start point to the end point and each point, and a height and a width of the clustering area from the point cloud data (S130). At this time, the vehicle recognizing apparatus may determine the shape of the point cloud as any one of a rectangle type, a straight line type, and a curve type.

At this time, the vehicle recognizing apparatus may primarily classify the vehicle corresponding to the front object according to the shape determined at step S130 (S140).

After that, the vehicle recognizing apparatus may analyze the surroundings of the start point and the end point or the receiving signal strength indicator of the peak point surroundings according to the shape determined at step S130 corresponding to the primarily classified object (S150), and may decide the corresponding object as the vehicle according to the variation of the receiving signal strength indicator (S160).

Therefore, the vehicle recognizing apparatus may recognize the object, which was finally classified as the vehicle, as the vehicle (S170).

According to the present invention, it is possible to recognize the vehicle more quickly by classifying the object by using a LiDAR sensor and recognizing the front vehicle than by recognizing a front vehicle through the image.

In addition, according to the present invention, it is easy to implement a system by recognizing the vehicle by using a single LiDAR sensor and simplifying a sensor configuration, and may reduce cost because it does not need to implement an expensive ECU to process an image.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An apparatus for recognizing a vehicle, the apparatus comprising:
    a sensor configured to provide point cloud data corresponding to a front object detected by using a LiDAR;
    a shape determiner configured to determines a shape corresponding to the front object by analyzing the point cloud data provided from the sensor;
    a receiving sensitivity analyzer configured to analyze a receiving sensitivity change corresponding to each point of the point cloud data representing a shape of a vehicle provided by the sensor based on the shape of the vehicle;
    a decider configured to decide on whether the front object is a vehicle according to the shape corresponding to the front object and the receiving sensitivity change corresponding to points of the point cloud; and
    a detector configured to recognize and detect the front object as the vehicle based on the result decided by the decider.

2. The apparatus of claim 1, wherein the shape determiner estimates a size and a speed corresponding to the front object by clustering the point cloud data and tracking each point.

3. The apparatus of claim 1, wherein the shape determiner detects a peak point which has a peak value by calculating a distance between a vector connecting a start point to an end point and each point from the point cloud data.

4. The apparatus of claim 3, wherein the shape determiner determines a shape of the point cloud with any one of a rectangle type, a straight line type, and a curve type based on a distance between the start point and the end point, a peak value of distance between a vector connecting the start point to the end point and each point, and a height and a width of a clustering area from the point cloud data.

5. The apparatus of claim 4, wherein the decider primarily classifies the front object as the vehicle by deciding whether a shape of the point cloud corresponding to the front object is of the rectangle type or the straight line type.

6. The apparatus of claim 5, wherein the receiving sensitivity analyzer performs sampling and differentiates a receiving signal strength indicator (RSSI) of surroundings of a peak point, when a shape of the point cloud corresponding to the front object primarily classified as the vehicle is of the rectangle type.

7. The apparatus of claim 6, wherein the decider finally classifies a corresponding object as the vehicle, when a value, which is obtained by performing sampling and differentiating the receiving signal strength indicator (RSSI) of surroundings of the peak point, is approximately a peak index value.

8. The apparatus of claim 5, wherein the receiving sensitivity analyzer performs sampling and differentiates the receiving signal strength indicator of surroundings of the start point and the end point, when a shape of the point cloud corresponding to the front object primarily classified as the vehicle is of the straight line type.

9. The apparatus of claim 8, wherein the decider finally classifies a corresponding object as the vehicle, when a value, which is obtained by performing sampling and differentiating the receiving signal strength indicator of surroundings of the start point and the end point, is greater than a threshold and is approximately a start index and an end index.

10. The apparatus of claim 8, wherein the decider finally classifies a corresponding object as the vehicle, when a value, which is obtained by performing sampling and differentiating the receiving signal strength indicator of surroundings of the start point and the end point, is greater than a threshold, and is approximately either one of the start index and the end index, and a speed of the point cloud is greater than the threshold.

11. A method for recognizing a vehicle, the method comprising:

receiving a point cloud data corresponding to a front object detected through a LiDAR sensor;

determining a shape corresponding to a corresponding point cloud by analyzing the received point cloud data;

primarily classifying the front object as a vehicle according to the shape of the point cloud;

finally classifying the corresponding object as the vehicle according a receiving sensitivity variation by analyzing the receiving sensitivity variation of surroundings of a specific point according to the shape of the point cloud representing a vehicle shape corresponding to the object primarily classified as the vehicle; and recognizing and detecting the front object finally classified as the vehicle.

12. The method of claim 11, wherein the determining of the shape comprises determining the shape of the point cloud with any one of a rectangle type, a straight line type, and a curve type based on a distance between the start point and the end point, a peak value of distance between a vector connecting the start point to the end point and each point, and a height and a width of a clustering area from the point cloud data.

13. The method of claim 12, wherein the finally classifying of the corresponding object comprises primarily classifying the front object as the vehicle by deciding whether a shape of the point cloud corresponding to the front object is of the rectangle type or the straight line type.

* * * * *